United States Patent
Hautson et al.

(10) Patent No.: US 10,042,070 B2
(45) Date of Patent: Aug. 7, 2018

(54) METHOD FOR LOCATING MOBILE UTENSILS PRESENTED BEFORE A NETWORK OF MAGNETOMETERS

(71) Applicant: Commissariat à l'énergie atomique et aux energies alternatives, Paris (FR)

(72) Inventors: Tristan Hautson, Fontaine (FR); Timothée Jobert, Grenoble (FR); Jean-Luc Vallejo, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 790 days.

(21) Appl. No.: 14/572,025

(22) Filed: Dec. 16, 2014

(65) Prior Publication Data
US 2015/0168583 A1    Jun. 18, 2015

(30) Foreign Application Priority Data
Dec. 16, 2013    (FR) .................................... 13 62731

(51) Int. Cl.
*G01V 3/08*    (2006.01)

(52) U.S. Cl.
CPC ................ *G01V 3/08* (2013.01); *G01V 3/081* (2013.01)

(58) Field of Classification Search
CPC ................................. G01V 3/08; G01V 3/081
See application file for complete search history.

(56) References Cited

U.S. PATENT DOCUMENTS

| | | | |
|---|---|---|---|
| 5,731,996 A | 3/1998 | Gilbert | |
| 6,263,230 B1 | 7/2001 | Haynor et al. | |
| 6,269,324 B1* | 7/2001 | Rakijas | G01V 3/081 324/207.11 |
| 7,932,718 B1* | 4/2011 | Wiegert | G01V 3/081 324/245 |

(Continued)

FOREIGN PATENT DOCUMENTS

| | | |
|---|---|---|
| FR | 2988862 | 10/2013 |
| FR | 2988874 | 10/2013 |

OTHER PUBLICATIONS

Du et al., CN 2312742 Y, Machine translated version—as best as understood, 1999.*

*Primary Examiner* — John Breene
*Assistant Examiner* — Mohammad Islam
(74) *Attorney, Agent, or Firm* — Occhiuti & Rohlicek LLP

(57) ABSTRACT

A method for locating utensils involves (step a) measuring, by magnetometers, of the amplitude of the magnetic field, and (step b) estimating, with the magnetometer measurements the positions, orientations and amplitudes of the magnetic moments of the objects of the utensils. The method also includes (step c) detecting each immobile utensil and, in response, adding the immobile utensil to a list, and (step d) establishing measurements from the magnetometers when they are exclusively in the presence of a reference magnetic field generated only by magnetic objects of all the immobile utensils in the list of immobile utensils. The method further includes (step e) calculating the amplitude of a disturbance on the basis of the differences between the measurements performed in step a) and the measurements established in step d). If the amplitude of the disturbance crosses a predetermined threshold, step b) is executed, otherwise the method returns to step a).

20 Claims, 2 Drawing Sheets

(56) References Cited

U.S. PATENT DOCUMENTS

| | | | | |
|---|---|---|---|---|
| 2002/0171427 A1* | 11/2002 | Wiegert | ............... | B63G 7/06 |
| | | | | 324/345 |
| 2009/0070063 A1* | 3/2009 | Edelstein | ............... | G01V 3/081 |
| | | | | 702/150 |
| 2011/0084692 A1* | 4/2011 | Billeres | ............... | A61B 5/06 |
| | | | | 324/244 |
| 2011/0248706 A1* | 10/2011 | Davis | ............... | G01B 7/003 |
| | | | | 324/207.11 |
| 2012/0217960 A1* | 8/2012 | Ausserlechner | ... | G01R 33/0206 |
| | | | | 324/252 |
| 2012/0249634 A1 | 10/2012 | Aubouy | | |
| 2013/0249784 A1* | 9/2013 | Gustafson | ............... | G01R 33/072 |
| | | | | 345/156 |
| 2013/0320966 A1* | 12/2013 | Oliver | ............... | G01R 33/0035 |
| | | | | 324/202 |
| 2014/0175744 A1* | 6/2014 | Yu | ............... | A63F 3/00533 |
| | | | | 273/239 |

* cited by examiner

METHOD FOR LOCATING MOBILE UTENSILS PRESENTED BEFORE A NETWORK OF MAGNETOMETERS

RELATED APPLICATIONS

Under 35 USC 119, this application claims the benefit of the Dec. 16, 2013 priority date of French application number 1362731, the content of which is herein incorporated by reference in its entirety.

FIELD OF INVENTION

The invention concerns a method and a device for locating mobile utensils that are presented before a network of magnetometers. The invention likewise concerns an information recording medium for implementing the method.

BACKGROUND

The patent applications FR2 988 862 and FR2 988 874 disclose methods for locating mobile utensils that are presented before a network of magnetometers having N triaxial magnetometers mechanically connected to one another without any degree of freedom in order to preserve a known distance between each of the magnetometers, each utensil having at least one magnetic object, where N is an integer greater than or equal to five. The known methods involve iterating steps a) and b) as defined below at successive instants in time in order to obtain the estimated values of each variable at the various successive instants.

Step a) includes the measurement, by each of the magnetometers, of the amplitude of the magnetic field along each of its measurement axes, Step b) includes the estimation, on the basis of the measurements from the magnetometers, of the values of a plurality of variables by resolving a current system of equations connecting the variables to each measurement from a triaxial magnetometer of the network, the variables corresponding to the positions, orientations and amplitudes of the magnetic moments of the magnetic objects of the utensils to be located.

These methods work particularly well. In particular, the methods are capable of locating numerous different mobile magnetic objects and therefore numerous utensils. Moreover, they are also capable of simultaneously locating a plurality of mobile utensils that are mechanically independent of one another. On account of these capabilities, the methods are referred to as "flexible".

In order to be capable of simultaneously locating numerous mobile utensils, the system of equations has numerous variables to be estimated. Typically, for each magnetic object of the utensil to be located, the system of equations has six variables to be estimated.

The estimation of the values of the numerous variables of the system requires the execution of a large number of operations by the computer because the system of equations is nonlinear. In point of fact, the greater the number of operations to be executed by the computer, the more the power consumption of the computer increases.

SUMMARY

The aim of the invention is to reduce the power consumption of a computer that executes a locating method without reducing the flexibility of the method.

The method above makes it possible to avoid triggering unnecessary executions of step b), that is to say executions of step b) when no utensil is moved. It therefore allows the power consumption of the computer executing the method to be reduced. The method is also faster to execute.

Moreover, the method allows detecting that execution of step b) is necessary without having to resolve the current system of equations, for example, after every iteration of step a) in order to determine an increase in the estimation error.

The reason is that the amplitude of the disturbance is calculated directly on the basis of the values established for the measurements from the magnetometers when the utensils are immobile and measurements performed during the last execution of step a). It is therefore not necessary to execute step b) in order to discover that execution thereof was unnecessary. This likewise reduces the number of operations performed by the computer and therefore the power consumption thereof when it executes the method.

The embodiments of the method may have one or more of the features of the dependent claims.

Among the advantages of various practices of the method are calculation of the barycenter of the disturbance allows simple identification, without execution of step b), of the utensil that has been moved among all of the utensils that the list of immobile utensils contains; deduction of the presence of a new utensil on the basis of the distance that separates the immobile utensils from the barycenter of the disturbance allows automatic adaptation of the system of equations in response to the addition of a new utensil without having to execute step b); identification of the utensil that has been moved among those that are present in the list of immobile utensils using a correlation between the magnetic field generated by the magnetic objects of the utensil and the disturbance allows simple identification, without executing step b), of the utensil that has been moved; deduction that a new utensil has been added from the fact that the correlation between the magnetic field generated by the magnetic objects of the utensils and the current disturbance are all below a predetermined threshold allows dynamic and automatic adaptation of the system of equations in response to the addition of a new utensil; replacement of the variables of the current system of equations coding the positions, orientations and amplitudes of the magnetic objects of the immobile utensils with constants and then, each time a utensil is moved again, performance of the inverse operation allows automatic adaptation of the system of equations as a function of the movement of the utensils that are realized and therefore an increase in the precision of location of the moved utensil; and elimination, from the system of equations, of the variables coding the position, the orientation and the amplitude of the magnetic objects of utensils that are at a predetermined distance from the magnetometers allows simplification of the system of equations as utensils are withdrawn.

The invention likewise relates to an information recording medium having instructions for the execution of the above method when the instructions are executed by an electronic computer.

The method as claimed represents an improvement in computer technology by making it possible for the computer to use less energy to carry out a task. This is a non-abstract and tangible improvement to a legitimate area of technology. The invention as claimed is limited to non-abstract implementations. All abstract implementations are hereby disclaimed.

The invention will be better understood upon reading the description that follows, provided solely by way of non-limiting example and with reference to the drawings.

BRIEF DESCRIPTION OF THE DRAWINGS

In the figures, the same references are used to denote the same elements.

In the remainder of this description, the features and functions that are well known to a person skilled in the art are not described in detail.

DETAILED DESCRIPTION

Figure 1:
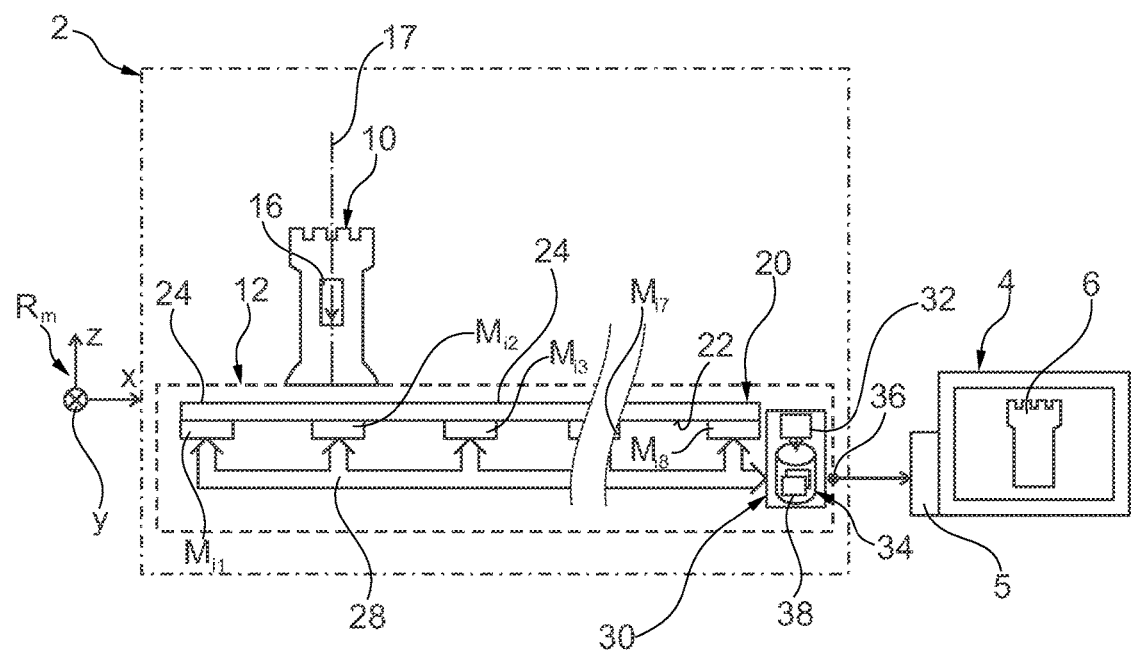
FIG. 1 is a schematic illustration of a man/machine interface allowing an electrical appliance to be controlled.

FIG. 1 shows a man/machine interface 2 allowing an electrical appliance 4 to be controlled. In this case, the electrical appliance has a screen and a control unit 5 that is capable of controlling the display of an image on the screen.

Subsequently, the operation of the interface 2 is illustrated in the case in which the control unit 5 is a video games console. By way of example, the control unit 5 controls the movement of pieces on the screen. To simplify the illustration, only one piece 6 is shown. However, the interface 2 can be used in numerous other applications as described at the end of this description.

The interface 2 has a plurality of utensils that can be moved directly manually by a human being, subsequently called a "user". Each of the utensils has at least one magnetic object. In this case, each magnetic object is a permanent magnet. To simplify FIG. 1, only one utensil 10 is shown in this figure.

Each utensil can be moved freely, directly manually by the user, in an orthogonal reference frame Rm that is fixed without any degree of freedom to a device 12. In this case, the X and Y directions of the reference frame Rm are horizontal and the Z direction is vertical. Each utensil weighs less than one kilogram and, preferably, less than 200 grams or 100 grams. The dimensions of each utensil are sufficiently small for the utensil to be able to be grasped and moved by a single hand of the user.

In this embodiment, the utensil 10 comprises a body 14 and a permanent magnet 16. By way of example, the body 14 extends along a longitudinal axis 17. The lower portion of the body 14 has a foot that is capable of immobilizing, in the reference frame Rm, the body 14 when the foot rests on a horizontal face. In this case, the utensil 10 is a piece in a game of chess. By way of illustration, the body 14 has the shape of a rook that can easily be grasped by the user.

By way of example, the body 14 is entirely made of a nonmagnetic material, that is to say a material that does not exhibit any magnetic property that can be measured by the device 12. This material is plastic, for example. The utensil 10 is located, in the reference frame Rm, on the basis of the position and orientation of the magnet 16. The magnet 16 is fixed without any degree of freedom to the utensil 10. The direction of the magnetic moment of the magnet 16 coincides with the longitudinal axis 17 of the body 14 in this case. In FIG. 1 and those that follow, the direction of the magnetic moment of a magnet is shown by an arrow.

The magnet 16 exhibits a non-zero magnetic moment even in the absence of an external magnetic field. Typically, in this description, the coercive magnetic field of each magnet is greater than 100 A·m$^{-1}$ or 500 A·m$^{-1}$. By way of example, the magnet is made of a ferromagnetic or ferrimagnetic material. The power of each permanent magnet is typically greater than 0.01 A·m$^2$ or 0.1 A·m$^2$.

The greatest length of the magnet is subsequently denoted L.

To simplify the description, it is likewise supposed that the structure of the other utensils that can be used in the interface 2 is identical to that of the utensil 10 or differs from that of the utensil 10 only in the shape of the body 14.

The device 12 allows one or more magnets to be located in the reference frame Rm. In this case, locating a magnet is understood to mean determining of the position and orientation of the magnet 16 in the reference frame Rm. The position is defined unambiguously by the values of three variables, for example the coordinates x, y and z in the reference frame Rm. More precisely, in the case of a magnet, the variables x, y and z are the coordinates of the geometric center of the magnet. The center of geometry of an object is the barycenter of all of the points of the object, assigning the same weight to each of the points. The orientation of the magnetic moment of a magnet is defined in the reference frame Rm by the values of two variables $\theta_y$ and $\theta_z$. In this case, the variables $\theta_y$ and $\theta_z$ are the angles of the magnetic moment of the magnet in relation to the Y and Z axes, respectively, of the reference frame Rm. The device 12 likewise determines a sixth variable A. The variable A is the amplitude of the magnetic moment of the magnet.

The device 12 has a network of N triaxial magnetometers $M_{ij}$. In FIG. 1, the vertical wavy lines indicate that a portion of the device 12 has not been shown.

Typically, N is greater than five and, preferably, greater than sixteen or thirty-two. In this case, N is greater than or equal to sixty-four.

In this embodiment, the magnetometers $M_{ij}$ are aligned in rows and columns to form a matrix. In this case, the matrix has eight rows and eight columns. The indices i and j identify the row and the column, respectively, of the matrix at the intersection of which the magnetometer $M_{ij}$ is situated. In FIG. 1, only the magnetometers $M_{i1}$, $M_{i2}$, $M_{i3}$, $M_{i4}$ and $M_{i8}$ of a row i are visible. The position of the magnetometers $M_{ij}$ in relation to one another is described in more detail with reference to FIG. 2.

Each magnetometer $M_{ij}$ is fixed without any degree of freedom to the other magnetometers. The magnetometers $M_{ij}$ are fixed without any degree of freedom to a rear face 22 of a rigid plate 20. The rigid plate exhibits a front face 24 turned toward the magnet 16. The plate 20 is produced from a rigid nonmagnetic material. By way of example, the plate 20 is made of glass.

Each magnetometer $M_{ij}$ measures the direction and the intensity of the magnetic field generated by the magnets that are present before the face 24. For this, each magnetometer $M_{ij}$ measures the norm or amplitude of the orthogonal projection of the magnetic field at the magnetometer $M_{ij}$ on three measurement axes of the magnetometer. In this case, the three measurement axes are orthogonal to one another. By way of example, the measurement axes of each of the magnetometers $M_{ij}$ are parallel to the X, Y and Z axes, respectively, of the reference frame. The sensitivity of the magnetometer $M_{ij}$ is $4 \cdot 10^{-7}$T, for example.

Each magnetometer $M_{ij}$ is connected to a processing unit 30 by means of a bus 28 for transmitting information.

The processing unit 30 is capable, for each magnet, of locating the magnet in the reference frame Rm and of estimating the amplitude of its magnetic moment on the basis of the measurements from the magnetometers $M_{ij}$. The unit 30 has a programmable electronic computer 32 that is capable of executing instructions recorded on an information recording medium. The unit 30 therefore also has a memory 34 containing the instructions necessary for the computer 32 to execute the method of FIG. 4 or 5. The unit 30 implements a mathematical model $M_P$ associating each measurement from a magnetometer $M_{ij}$ with the positions, orientations and amplitudes of the magnetic moments of P magnetic objects in the reference frame Rm. Each model $M_P$ is in the form of a system of equations in which a first set of variables represents the positions and orientations of the P magnetic objects and the amplitudes of the magnetic moments of the objects. A second set of variables represents the measurements from the magnetometers $M_{ij}$. In order to obtain the positions, orientations and amplitudes of the magnetic moments of the P magnetic objects, the variables of the first set are the unknowns and the values of the variables of the second set are known. Conversely, in order to obtain an estimate of the values measured by the magnetometers $M_{ij}$, the variables of the first set are known and the values of the variables of the second set are the unknowns. Each model is typically constructed on the basis of the physical magnetism equations. Each model is parameterized by the known distances between the magnetometers $M_{ij}$. In this case, the magnetic objects are the permanent magnets. By way of example, in order to construct this model, each permanent magnet is approximated by a magnetic dipole. This approximation introduces only very few errors if the distance between the permanent magnet and the magnetometer $M_{ij}$ is greater than 2 L and, preferably, greater than 3 L, where L is the greatest dimension of the permanent magnet. Typically, L is less than 20 cm and, preferably, less than 10 or 5 cm or 1 cm.

In this case, the model $M_P$ is nonlinear. Consequently, in order to locate the permanent magnets, the unit 30 resolves it by implementing an algorithm for estimating the solution thereto. By way of example, the algorithm used is a Kalman filter known by the term "Unscented Kalman Filter." It will also be noted that in order to estimate the values measured by the magnetometers on the basis of known positions, orientations and amplitudes from permanent magnets and using the model $M_P$, it is not necessary to implement such algorithms for estimating the solution. By way of example, it suffices to replace the variables coding the positions, orientations, and amplitudes with their respective values.

Given that each magnetic object is characterized by three variables in order to know its position, two variables in order to know its orientation and one variable in order to know the amplitude of its magnetic moment, the maximum number of magnetic objects that can be located simultaneously by the network of N magnetometers is less than N/2. Consequently, the value of the number P is less than or equal to N/2 and, preferably, less than N/5 or N/10 or N/20 in order to have redundant measurements. The redundancy of the measurements allows the precision of the location of the magnet objects to be improved.

Moreover, in this embodiment, it is supposed that there is never more than a single utensil moved at each instant. Therefore, at each instant there is no more than one permanent magnet moving. In these conditions, initially, the unit 30 implements the model $M_1$. However, in this example, the models $M_1$ to $M_{32}$ are also recorded in the memory 34 in order to estimate the measurements from the magnetometers $M_{ij}$.

The unit 30 is likewise capable of transmitting a command to the appliance 4 by means of an interface 36 connected to the appliance 4.

The memory 34 also comprises a database 38 that records the immobile utensils and the respective positions thereof. The database 38 is described in more detail with reference to FIG. 3.

Figure 2:
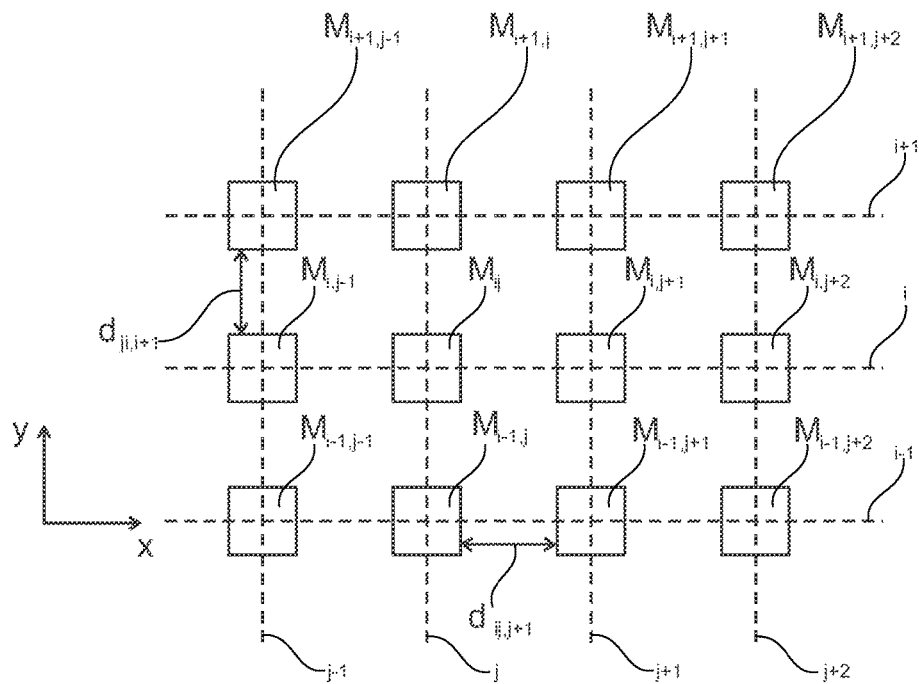
FIG. 2 is a partial illustration, in plan view, of a network of magnetometers implemented in the man/machine interface of FIG. 1.

FIG. 2 shows some of the magnetometers $M_{ij}$ of the device 12. The magnetometers $M_{ij}$ are aligned in rows i parallel to the X direction. The magnetometers are likewise aligned in columns j parallel to the Y direction in order to form a matrix. The rows i and the columns j are arranged in the order of increasing indices.

The center of the magnetometer $M_{ij}$ is situated at the intersection of the row i and the column j. The center of the magnetometer corresponds to the point at which the magnetic field is measured by the magnetometer. In this case, the indices i and j belong to the range [1 to 8].

The centers of two magnetometers $M_{ij}$ and $M_{i,j+1}$ that are immediately consecutive along a row i are separated by a known distance $d_{i,j,j+1}$. Similarly, the center of two magnetometers $M_{ij}$ and $M_{i+1,j}$ that are immediately consecutive along one and the same column j are separated by a known distance $d_{j,i,i+1}$.

In the particular case described here, whatever the row i, the distance $d_{i,j,j+1}$ is the same. This distance is therefore denoted $d_j$. Similarly, whatever the column j, the distance $d_{j,i,i+1}$ between two magnetometers is the same. The distance is therefore denoted $d_i$.

In this case, the distances $d_i$ and $d_j$ are both equal to d.

Typically, the distance d is shorter than, and preferably twice as short as, the shortest distance that can exist between two magnetic objects that are simultaneously present before the face 24 during normal use of the interface 2. In this case, the distance d is between 1 and 4 cm when:

the power of the permanent magnet is 0.5 A·m$^2$, the sensitivity of the magnetometers is $4 \cdot 10^{-7}$T, and the number of magnetometers $M_{ij}$ is sixty-four.

Figure 3:
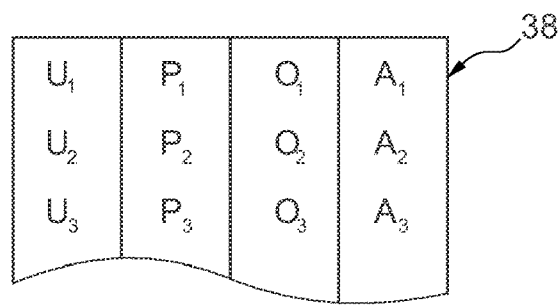
FIG. 3 is a schematic illustration of a database used in the interface of FIG. 1.

FIG. 3 shows the database 38 in more detail. The database 38 contains an identifier $U_k$ for each different immobile utensil in the reference frame Rm. The identifier $U_k$ allows the utensil to be distinguished from all the other utensils that are simultaneously present before the face 24. With each identifier $U_k$, the database 38 associates the position $P_k$ of its permanent magnet, the orientation $O_k$ of the magnetic moment of the permanent magnet and the amplitude $A_k$ of the magnetic moment of the permanent magnet. In order to simplify the illustration, only three rows of the database 38, for the identifiers $U_1$, $U_2$ and $U_3$, respectively, are shown. Subsequently, given that the database 38 contains the list of immobile utensils in their reference frame Rm, the database 38 is likewise called a list of immobile utensils.

The operation of the interface 2 will now be described with reference to the method of FIG. 4.

In this embodiment, it is supposed that initially no utensil is present on the face 24 of the device 12. Consequently, the database 38 is empty. In this description, it is likewise considered that the earth's magnetic field is negligible in the measurements from the magnetometers $M_{ij}$. Assuming that the amplitude of the earth's magnetic field would not be negligible, it is then subsequently considered that the measurement of the earth's magnetic field is systematically deducted from the current measurement from the magnetometers so that only the difference between the two measurements is taken into account by the computer 32 during the execution of the following method.

In step 100, the magnetometer $M_{ij}$ measures the magnetic field that is present.

Next, in step 102, the computer 32 acquires the measurements from the magnetometers $M_{ij}$.

In step 104, the computer 32 detects the presence and, alternately, the absence of a magnetic disturbance.

For this, during an operation 106, the computer 32 establishes the value that would be measured by each magnetometer $M_{ij}$ if the only magnetic field present were the magnetic field generated by the permanent magnets of the utensils listed in the database 38. The magnetic field is subsequently called "reference magnetic field".

In this case, the computer 32 calculates the values on the basis of the positions, orientations and amplitudes of the magnetic moments recorded for each permanent magnet of the utensils that the database 38 contains.

By way of example, for this, the computer 32 selects a model $M_p$, where P is equal to the number of permanent magnets whose positions, orientations and amplitudes are recorded in the database 38. Next, it replaces the variables coding the positions, orientations and amplitudes of each magnetic dipole with the corresponding values that the database 38 contains. In this way, the computer 32 obtains the values that the magnetometers $M_{ij}$ ought to measure if only the immobile utensils were present before the face 24. Subsequently, the values established in this manner for each measurement axis of each magnetometer $M_{ij}$ are called "reference measurements."

In the event of the database 38 being empty, the reference measurements are zero, because the reference magnetic field is likewise zero.

In this case, "disturbance" denotes all of the differences, for each measurement axis of each magnetometer $M_{ij}$, between:
  the last reference measurement established during the operation 106, and
  the last measurement acquired in step 102.

During an operation 108, the computer 32 calculates the amplitude of the disturbance on the basis of the differences between the reference measurements established in step 106 and the measurements acquired in step 102. By way of example, the amplitude $A_P$ of the disturbance is calculated using the following relationship: $A_P = \Sigma(m_{ijn} - m_{refijn})^2$, where:
  $m_{ijn}$ is the measurement from the magnetometer $M_{ij}$ on its measurement axis n,
  $M_{refijn}$ is the reference measurement for the same magnetometer and on the same measurement axis, established during the operation 106,
  the index n identifies the measurement axis in the relationship above.

Moreover, the sum above is calculated for i and j varying from 1 to N, and for n varying from 1 to 3.

During an operation 110, the computer 32 compares the calculated amplitude $A_P$ with a predetermined threshold $S_P$. If the amplitude $A_P$ is below or equal to the threshold $S_P$, then no disturbance is detected, and the method returns to step 100.

In the opposite case, that is to say if the amplitude $A_P$ is above the threshold $S_P$, a disturbance is detected, which means that a utensil has been added or moved in relation to the previous situation, in which all the utensils were immobile.

In this case, the method continues with step 120 in which the computer 32 calculates the coordinates of the centerbarycenter $B_P$ of the disturbance. More precisely, in step 120, the computer 32 calculates the coordinates of the centerbarycenter of all of the points $P_{ij}$ by assigning to each point $P_{ij}$ a weighting coefficient $C_{ij}$ that is a function of the difference between the reference measurements and the measurements acquired from the magnetometer $M_{ij}$. The coordinates of the point $P_{ij}$ are equal to the coordinates of the geometric center of the magnetometer $M_{ij}$. The weighting coefficient $C_{ij}$ is given by the following relationship, for example: $C_{ij} = (m_{ij1} - m_{refij1})^2 + (m_{ij2} - M_{refij2})^2 + (m_{ij3} - M_{refij3})^2$.

In step 122, if the database 38 is empty, that is to say that it currently contains no immobile utensil, then the computer 32 automatically selects the system of equations of the model $M_1$ as the current system of equations.

Conversely, if the database 38 contains at least one identifier for at least one immobile utensil, the computer 32 proceeds to step 124 of identification of the utensil that has been moved among all of the utensils identified by the database 38.

For this, during an operation 128, for each utensil identified in the database 38, the computer 32 calculates the distance $D_b$ between the position of the permanent magnet of the utensil recorded in the database 38 and the coordinates of the centerbarycenter $B_p$.

During an operation 130, the computer selects, from the database 38, the utensil for which the previously calculated distance $D_b$ is the shortest.

During an operation 132, the computer 32 then compares the distance $D_b$ calculated for the utensil selected in step 130 with a predetermined threshold $S_b$. If the distance $D_b$ is below the threshold $S_b$, the computer 32 identifies the utensil as being that which has been moved and that has caused the disturbance. In this case, the method continues with step 140.

In the opposite case, that is to say if the distance $D_b$ is above the threshold $S_b$, this means that none of the utensils identified in the database 38 has been identified as being that which has been moved in order to create the disturbance. In the latter case, the method continues with step 142.

In step 140, the computer 32 eliminates from the database 38 the identifier of the identified utensil and all the data associated with the identified utensil. Next, it replaces, in the current system of equations, the constant numerical values that coded the position, orientation and amplitude of the magnetic moment of the permanent magnet of the utensil with variables. A new system of equations is then obtained. This new system of equations replaces the current system of equations for the subsequent iterations of step 150.

In step 142, the computer 32 adds to the current system of equations new equations containing six new variables x, y, z, $\theta_y$, $\theta_z$ and A coding the position, the orientation and the amplitude of the magnetic moment of a permanent magnet of a new utensil. The added equations connect the variables to the measurements performed by each magnetometer $M_{ij}$. By way of example, the equations are obtained on the basis of the following relationship: $B(r,r') = (\mu_0/4\pi)[3 \cdot (r-r') \cdot [m \cdot (r-r')]/|r-r'|^5 - m/|r-r'|^3]$, where:
  $\mu_0$ to is the magnetic permeability of free space at $4\pi \cdot 10^{-7}$ H·m$^{-1}$;
  m is the vector of the magnetic moment of the permanent magnet in A·m$^2$;
  r' is the position vector of the magnet in the reference frame Rm;
  r is the position vector of the magnetometer $M_{ij}$ in the reference frame Rm;

(r−r') is the vector linking the center of the magnet to the measurement point;

B(r,r') is the vector of the magnetic field at the magnetometer $M_{ij}$ in tesla;

|...| is the function returning the norm of a vector;

"." is the scalar product function;

"·" is the multiplication by a real number.

On the basis of this relationship and with knowledge of the position of the magnetometer $M_{ij}$ in the reference frame Rm, three equations are obtained connecting the variables x, y, z, $\theta_y$, $\theta_z$, A to the measurements, respectively, on the three measurement axes of the magnetometer $M_{ij}$.

Thus, at the end of step 142, a new system of equations is obtained that is used instead of the current system of equations for the subsequent iterations of step 150.

At the end of steps 122 and 142, the computer 32 has a system of equations, called the current system of equations, connecting the variables coding the position, orientation and amplitude of the magnetic moment of the permanent magnet that is moving to the measurements from the magnetometers.

In step 150, the computer 32 estimates the position, orientation and amplitude of the magnetic moment of the permanent magnet of the utensil that is moving using the current system of equations. For this, it resolves the current system of equations by using the last measurements acquired in step 102. By way of example, the solution to this current system of equations is estimated by using a Kalman filter like an unscented Kalman filter. In step 150, the values of the variables to be estimated coding the position are initialized by taking them to be equal to the coordinates of the centerbarycenter $B_p$ that are calculated in step 120. This allows acceleration of the convergence of the method on the estimation of the values that resolve the current system of equations.

Next, in step 152, the computer 32 controls the appliance 4 as a function of the position, orientation and amplitude that are estimated in step 150. By way of example, this position, this orientation and this amplitude that are estimated are transmitted to the control unit 5, which responds by controlling a movement of a graphical representation of the utensil on the screen.

At the end of step 152, the method returns to step 100.

In parallel with steps 104 to 152, in step 160, the computer 32 detects whether a utensil becomes immobile, that is to say that the utensil is no longer moving in the reference frame Rm. For this, it uses the previous estimations of the positions and orientations of the permanent magnet of the utensil.

By way of example, during an operation 162, the computer 32 calculates the variance $V_d$ in the last X positions estimated for the permanent magnet of the utensil, where X is an integer that, by way of example, is dependent on the refresh rate $F_{ech}$ of the measurements from the magnetometers. It is possible to take a number of samples corresponding to more than one second, that is to say a number X greater than $F_{ech} \times 1$ second. By way of example, X is greater than 10, 100 or 1000.

During an operation 164, the computer 32 compares the variance $V_d$ with a predetermined threshold $S_v$.

If the variance $V_d$ is above the threshold $S_v$, then the computer 32 considers the utensil not to be immobile and the method returns to step 100.

In the opposite case, that is to say if the variance of the utensil is below the threshold $S_v$, the computer 32 then considers the utensil now to be immobile. In this case, it proceeds to step 166 in which the computer 32 adds the identifier of the utensil to the database 38 and records, in association with the identifier, the last position, orientation and amplitude of the magnetic moment that were estimated for the permanent magnet of the utensil.

Moreover, in step 166, the computer 32 replaces, in the current system of equations, the variables coding the position, orientation and amplitude of the magnetic moment of the permanent magnet of the utensil with constant numerical values. The constant numerical values are equal to the last position, orientation and amplitude estimated for the permanent magnet during the last execution of step 150. Thus, following the execution of step 166, the current system of equations has fewer variables to be estimated than before.

After step 166, the method returns to step 100.

In parallel with steps 104 to 152, in step 170, the computer 32 likewise detects that a utensil has been withdrawn. For this, during an operation 172, the computer 32 calculates the distance $D_u$ that separates the permanent magnet of the utensil from the closest magnetometer $M_{ij}$. The distance $D_u$ is calculated on the basis of the last position estimated for the permanent magnet of the utensil.

Next, during an operation 174, the computer 32 compares the distance $D_u$ with a predetermined threshold $S_u$. If the distance $D_u$ is below or equal to the threshold $S_u$, then the computer 32 preserves the variables coding the position, orientation and amplitude of the magnet of the utensil in the current system of equations.

In the opposite case, that is to say if the distance $D_u$ is above the threshold $S_u$, during an operation 176, the computer 32 eliminates from the current system of equations the equations that involve the variables coding the position, orientation and amplitude of the permanent magnet of the utensil. The computer thus eliminates the contribution of the utensil that has been eliminated. It is then no longer taken into account in the calculation.

At the end of step 170, the method returns to step 100.

The implementation of the method will now be illustrated in the particular case in which the utensils are the pieces in a game of chess and in the case in which a chessboard has been drawn on the face 24. Initially, it is supposed that no pieces are present on the face 24.

When a player places the first piece on the face 24, the computer detects a disturbance. Given that it is the first piece set down, the database 38 is empty. Consequently, the computer 32 locates the first piece, in so far as it is moved, by using the system of equations of the model $M_1$.

Next, the player sets down the first piece on the face 24 and leaves it immobile at this location. The computer 32 then automatically detects that the piece is immobile. In response, it adds an identifier for the piece to the database 38 and the variables coding the position, orientation and amplitude of the permanent magnet of the piece are replaced with constant values in the current system of equations.

The player then sets down a second piece on the face 24. The method described above then prompts the computer 32, this time, to add the identifier of a second utensil to the database 38 and to replace, in the current system of equations, the variables coding the position, orientation and amplitude of the permanent magnet of the second piece with constants. At this stage, the current system of equations therefore has constants coding the positions, orientations and amplitudes of both the first and second pieces.

What has just been described above is reiterated for each piece set down, in succession, on the face 24. Once all of the pieces have been set down on the face 24, before the players begin to play, the database 38 then has the identifiers of thirty-two pieces.

Next, each time a player moves a piece, the computer detects a disturbance and then identifies the piece moved in the database 38. In so far as a piece is moved, the computer 32 locates it and, by way of example, controls the appliance 4 to move a corresponding piece on the screen. When the user puts down the piece on another square, the computer 32 detects that the piece becomes immobile. It therefore adds the piece to the database 38 of immobile utensils again and records its new position in this very database.

When a player removes a piece from the chessboard, the computer 32 detects that the piece moves away from the chessboard and that the distance that separates it from the closest magnetometer $M_{ij}$ becomes above the threshold $S_u$. In response, it eliminates the variables coding the position, orientation and amplitude of the permanent magnet of the piece from the current system of equations. At the same time, it removes the graphical representation of the piece from the screen of the appliance 4, for example.

Thus, the method implemented by the computer 32 resolves only a system of equations with no more than six variables to be estimated in order to locate a piece, whereas 32 pieces may be simultaneously present on the chessboard. For this, the computer 32 makes use of the fact that all the pieces are moved only in succession. The fact that a system of equations having only few variables is used in order to estimate the position of a piece that moves allows the precision of location of the movement of the piece to be increased. This likewise limits the number of operations to be executed by the computer 32, which decreases its power consumption.

Figure 4:
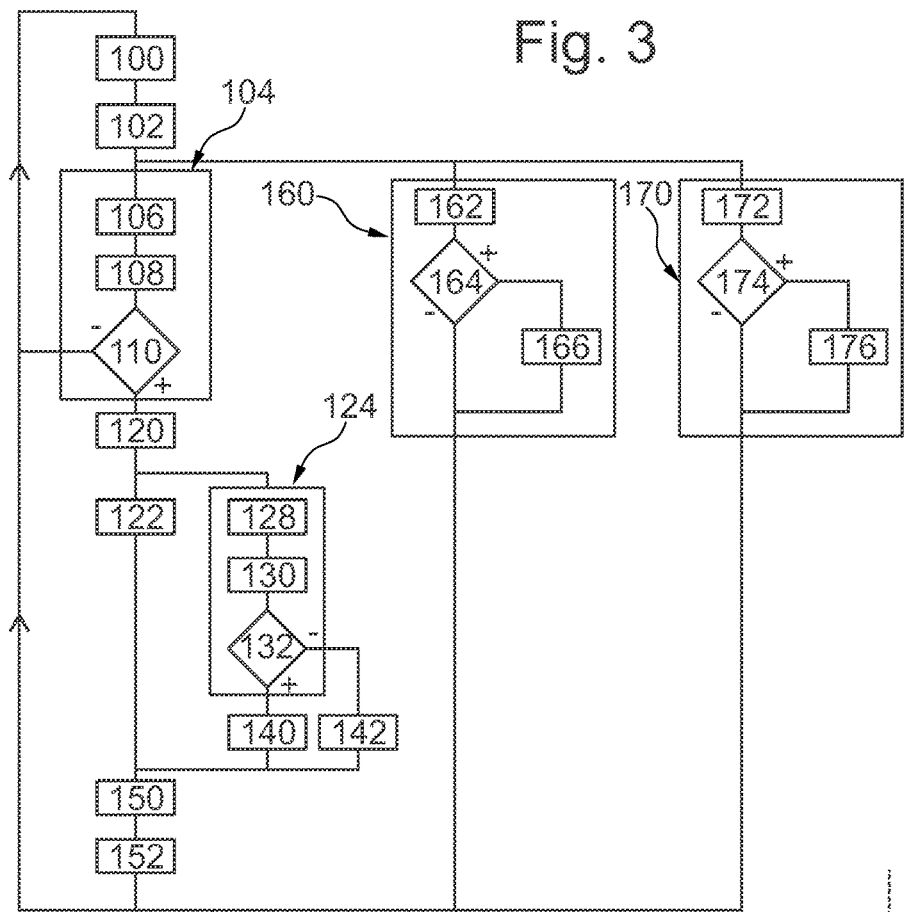
FIG. 4 is a flowchart for a method for controlling an electrical appliance using the man/machine interface of FIG. 1.
Figure 5:
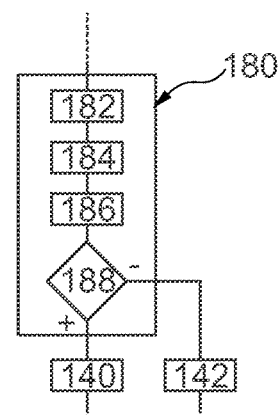
FIG. 5 is a partial flowchart for another method for controlling an electrical appliance using the man/machine interface of FIG. 1.

FIG. 5 shows another embodiment of the method of FIG. 4. The method of FIG. 5 is identical to the method of FIG. 4, except that step 124 is replaced by step 180. To simplify the figure, only step 180 has been shown.

More precisely, step 180 involves identifying the utensil for which an identifier is contained in the database 38 and that has been moved. For this, in this case, the computer 32 uses a correlation between the disturbance and the magnetic field generated by the utensils identified by the database 38.

By way of example, during an operation 182, for each utensil identified in the database 38, the computer 32 estimates the magnetic field that would be measured by each magnetometer $M_{ij}$ if the utensil were the only one to be present before the face 24. By way of example, to this end, the computer 32 uses the system of equations of the model $M_1$ and the position, orientation and amplitude of the permanent magnet of the utensil that are recorded in the database 38.

Next, during an operation 184, the computer 32 calculates a value that is representative of the correlation $C_p$ that exists between the measurements calculated during the operation 182 and the disturbance.

During an operation 186, the computer 32 selects the utensil for which the correlation is at a maximum.

Finally, during an operation 188, the computer 32 compares the correlation $C_p$ calculated for the utensil selected during the operation 186 with a predetermined threshold $S_c$.

If the correlation $C_p$ is above the threshold $S_c$, the utensil that moves is identified in the database 38 and the method continues with step 140.

Conversely, if the correlation $C_p$ is below the threshold $S_c$, the utensil that has caused the disturbance is not identified as being one of those from the database 38 and the method continues with step 142.

Numerous other embodiments of the device 12 are possible. By way of example, the front face 24 is not necessarily planar. By way of example, as a variant, it has a relief shape.

Typically, the relief shape may have hollow housings that are intended to receive and to immobilize the utensils in the housings.

It is possible to limit the number of locations at which a utensil may be arranged in relation to the front face 24. For this, the interface 2 has a plurality of locations, each equipped with keying to prevent a certain number of utensils from being fixed to the location and, conversely, to allow other, different utensils to be fixed to the location.

Utensils other than those described previously can be provided and used in the interface 2. By way of example, the body 14 of the utensil may be omitted. In this case, a utensil is reduced to a permanent magnet.

The approximation used to put together the model $M_P$ may also be a quaternary or higher approximation, that is to say that the magnetism equations are approximated to a higher order than that corresponding to dipole approximation.

The magnetometers of the network of magnetometers are not necessarily arranged in columns and rows. They may also be arranged in other patterns. By way of example, the magnetometers are disposed at each crest of each triangular or hexagonal mesh in a meshing for a plane.

The arrangement of the magnetometers in relation to one another may also be random or irregular. Thus, the distance between two immediately consecutive magnetometers in the network is not necessarily the same for all the pairs of two immediately consecutive magnetometers. By way of example, the density of magnetometers in a given area of the network may be higher than elsewhere. Increasing the density in a given area can allow the precision of the measurement in the area to be increased.

The network of magnetometers may also extend in three noncolinear directions in space. In these conditions, the magnetometers are distributed inside a three-dimensional volume.

The number N of magnetometers may likewise be greater than or equal to sixty-four or ninety.

All the magnetometers of the network of magnetometers are not necessarily identical to one another. As a variant, the magnetometers do not all have the same sensitivity.

The appliance 4 may be replaced by any type of electrical appliance that needs to be controlled in response to an action from a human being. By way of example, the controlled appliance may be a robot, a machine tool or the like.

In all the embodiments described here, the permanent magnet may be replaced by a magnetic object that is not continually supplied with power and that acquires a magnetic moment in the presence of an external continuous magnetic field, such as the earth's magnetic field. By way of example, the permanent magnet is replaced by a piece of soft magnetic material. A magnetic material is considered to be soft if its coercive magnetic field is less than 10 or 1 $A \cdot m^{-1}$. Such a piece exhibits a magnetic moment created by the interaction between the earth's magnetic field and the piece of soft magnetic material.

Numerous other embodiments of the method of FIG. 4 or 5 are possible. By way of example, the number of measurements used to calculate the variance $V_d$ may be a function of the duration of a sliding time window. Typically, only the measurements performed inside the sliding time window are taken into account for calculating the variance.

There are also other means than variance in order to determine whether a utensil is immobile. By way of example, it is possible to increment a counter while the utensil has not moved or has not moved very much. As soon as the counter reaches a predetermined threshold $S_{cmax}$, the utensil is termed immobile. More precisely, initially, the unit 30 memorizes the current position $P_n$ of the utensil as being the reference position $P_{ref}$. Each subsequent iteration verifies that the utensil has not moved very much in relation to the reference position $P_{ref}$. For this, by way of example, the unit 30 verifies whether the difference between the current position $P_n$ and the position $P_{ref}$ is below a predetermined threshold $S_{immo}$. If so, the unit 30 increments the counter. In the opposite case, the unit 30 reinitializes the reference position $P_{ref}$ by taking it to be equal to the current position $P_n$. The unit 30 reinitializes the counter at the same time. The same scheme is reproduced on each iteration and for each utensil. This method is easier to implement on-board and requires less computation power than calculation of the variance $V_d$.

During the operation 164, the threshold $S_v$ may be specific to the estimated variable. By way of example, a first threshold $S_{v1}$ is used when the variable codes a position of a first type of permanent magnet and a second threshold $S_{v2}$ is used when the variable codes the position of a second type of permanent magnet, for example, which is less powerful. The utensil is termed immobile if the variance on each variable of each of its permanent magnets is below the corresponding threshold.

Once estimated, the amplitude of the magnetic moments of the permanent magnets can be considered to be a constant. Thus, the computer 32 never replaces, in the current system of equations, the numerical value coding the amplitude of a magnetic moment of a permanent magnet with a variable. In other words, only the values coding the position and orientation of the permanent magnet are replaced with variables if a new estimation of the position and of the orientation of the permanent magnet needs to be performed. The amplitude of the permanent magnets of each utensil may thus be a data item that is known upon initialization of the device 12, so that it is not necessary to estimate the data item on the basis of measurements from the magnetometers $M_{ij}$.

The position, orientation and amplitude that are recorded in the database 38 are not necessarily taken to be equal to the last estimation of the values. As a variant, the values may be calculated on the basis of a plurality of estimations of the values obtained during the X previous estimations. By way of example, the values are calculated by taking them to be equal to the mean of the positions and orientations estimated during the last X iterations of step 150.

Other methods are possible for determining that a utensil is immobile. By way of example, the height of the utensil in relation to the face 24 is calculated on the basis of the estimated position of the permanent magnet of the utensil. If the height is below a predetermined threshold, this means that the utensil has been put on the face 24 and therefore that it is immobile. This embodiment is particularly relevant when the support is equipped with housings that do not allow horizontal movement when the utensil is inserted therein.

Other methods are possible for identifying the utensil in the database 38 that has been moved. By way of example, it is possible to implement a method called "partial convergence method" subsequently. This method involves identifying the variables of the utensil(s) in the database 38 that, if they were reintroduced into the current system of equations, would allow minimization of the error of the estimated positions and amplitudes. For this, the computer 32 proceeds as follows:

Operation 1): For the first utensil in the database 38, the computer 32 reintroduces into the current system of equations the variables coding the position and amplitude of the permanent magnets of the utensil. During this operation, only the variables of the first utensil are reintroduced into the system of equations. The variables of the other utensils in the database 38 are not reintroduced into the current system of equations. Thus, at the end of operation 1), a new system of equations is obtained that contains only the variables of the first utensil.

Operation 2): Next, the computer 32 resolves the new system of equations in order to obtain an estimate of the position and the amplitude of each permanent magnet of the first utensil.

Operation 3): Next, the computer 32 calculates an estimation error $E_{err}$ that is representative of the difference between: the estimated values of the measurements from the magnetometers $M_{ij}$ when the utensil is in the position and orientation estimated during operation 2), and the values actually measured by the magnetometers $M_{ij}$ at the same instant.

Operations 1) to 3) are iterated for the first, then the second through to the last utensil in the database 38. Next, the computer 32 selects the utensil for which the estimation error $E_{err}$ calculated during operation 3) is the smallest. If, for the selected utensil, the error $E_{err}$ is above a predetermined threshold $S_{err}$, then the utensil that has been moved is not identified in the database 38. If, conversely, the estimation error $E_{err}$ is below the threshold $S_{err}$, the utensil that has caused the disturbance is identified among those that the database 38 contains. By way of example, the value of the threshold $S_{err}$ is taken to be equal to the value of the error $E_{err}$ calculated on the basis of the positions and amplitudes estimated during the last iteration of step 150.

As a variant, if the database 38 is made up of utensils each containing a plurality of magnets fixed inside the utensil, the variables reintroduced during operation 1) correspond to the position and orientation of the utensil rather than to the position, orientation and magnetic moment of each magnet of the utensil.

The calculation of the coordinates of the centerbarycenter $B_p$ may be omitted notably if the utensil that has moved, among those whose identifiers are contained in the database 38, is identified without using the coordinates of the centerbarycenter $B_p$. In this case, when a new utensil is added, the position and orientation of the permanent magnet of the new utensil are initialized to predefined values. By way of example, the predefined values correspond to the center of the face 24.

Other methods are possible for detecting that a utensil has been withdrawn. By way of example, if the computer 32 detects that the utensil has become immobile in a position that is outside a predefined area of the reference frame Rm, then the utensil is considered to have been withdrawn. However, if the utensil remains sufficiently close to the magnetometers $M_{ij}$ for the magnetic field generated by its permanent magnet to be able to influence the measurement of at least one of the magnetometers $M_{ij}$ in non-negligible fashion, then the constants coding the position, orientation and amplitude of the permanent magnet of the utensil in the current system of equations are not eliminated from the current system of equations.

A utensil may have U permanent magnets, where U is an integer strictly greater than one. In this case, the utensil is associated not with six variables but rather with 6·U variables. Consequently, when the utensil is added to the database 38, it is the values of these 6·U variables that are recorded in the database 38. Moreover, when the utensil moves, the current system of equations has not six variables to be estimated but rather 6·U variables to be estimated.

The above methods have been described in the particular context in which no more than a single utensil moves at a given instant. However, in order to detect the presence and, alternately, the absence of a disturbance, this assumption is not necessary. More precisely, the operations described above for detecting the presence of a disturbance also work in the case in which the disturbance is caused by the simultaneous movement of two or more utensils. In the event of the disturbance being caused by the simultaneous movement of a plurality of utensils, steps 124 and 180 do not allow the utensils moved simultaneously to be identified in the database 38. Thus, in this case, the steps 124, 140 and 180 are omitted. Step 142 is then replaced with a step in which the current system of equations is reinitialized. By way of example, the system of equations is reinitialized by replacing all the numerical constants coding the positions, orientations and amplitudes of the magnets of the immobile utensils with variables to be estimated. The system of equations may also be reinitialized to a predetermined default state. By way of example, in the case of a game of chess described above, the reinitialization involves replacing the current system of equations with the system of equations of the model $M_{32}$. In the event of the disturbance being able to be caused by the simultaneous movement of a plurality of utensils, it is also possible to identify in the database 38 the utensils that are moved. By way of example, for this, the partial convergence method described above can be used. In this case, all the utensils in the database 38 that allow the error $E_{err}$ to be reduced are considered to be the utensils moved simultaneously. The current system of equations is then replaced for the subsequent iterations with a new system of equations in which the variables coding the position and the amplitude of the magnetic moment of each utensil identified as being in the course of movement are reintroduced.

As a variant, initially, the database 38 is not empty, but already has the identifiers and the positions, orientations and amplitudes of the permanent magnets of a plurality of immobile utensils. Such initialization of the database 38 may be realized without using the measurements from the magnetometers $M_{ij}$, for example, if the initial position of each utensil is considered to be known in advance. This is the case, by way of example, for utensils such as pieces in a game of chess or checkers.

The establishment of the measurements of the reference magnetic field may involve acquiring the measurements from the various magnetometers $M_{ij}$ at the instant at which all the utensils are immobile.

The amplitude of the disturbance can be calculated in different ways. By way of example, the amplitude $A_P$ is given by the following relationship: $A_p=\text{Max}[(n_{ijn}-m_{refijn})^2+(m_{ij2}-m_{refij2})^2+(m_{ij3}-m_{refij3})^2]$, calculated for all the indices i and j varying from 1 to N, where Max[ . . . ] is the function that returns the maximum of the terms between square brackets.

During the identification of the immobile utensil that has been moved, the operation 132 or 188 may be omitted. In this case, on each iteration of step 124 or 180, a utensil is systematically identified as being that which has been moved among those contained in the database 38.

Numerous different methods can be used in order to determine the position and orientation of the magnetic object. By way of example, the method described in U.S. Pat. No. 6,269,324 can be used. These methods do not necessarily use a Kalman filter. By way of example, the methods described in US2002/171427A1 or U.S. Pat. No. 6,263,230B1 are possible.

Having described the invention, and a preferred embodiment thereof, what is claimed as new and secured by Letters Patent is:

1. A method for locating mobile utensils from a plurality of utensils presented before a network of magnetometers, wherein said network comprises at least five triaxial magnetometers mechanically connected to one another without any degree of freedom in order to preserve a known distance between each of the magnetometers, wherein each of the magnetometers has measurement axes, wherein each utensil has at least one magnetic object, and wherein one or more of the utensils are able to be moved directly manually by a human being while remaining utensils remain immobile, said method comprising locating a first mobile utensil from the mobile utensils and locating a second mobile utensil from the mobile utensils, wherein locating a mobile utensil comprises, at successive instants, obtaining estimates of variables that correspond to positions, orientations, and amplitudes of magnetic moments of the magnetic objects of the utensils that are to be located, a utensil being located as soon as the position and orientation of the magnetic moment of each magnetic object of the utensil have been estimated, wherein obtaining estimates of each of the variables comprises carrying out iterations of a measurement step and a variable-estimation step, wherein the measurement step comprises causing each of the magnetometers to measure an amplitude of the magnetic field along each of the measurement axes thereof, wherein the variable-estimation step comprises, on the basis of the measurements from the magnetometers, estimating values of each of the variables by resolving a current system of equations connecting said variables to each measurement from a triaxial magnetometer of the network, detecting each immobile utensil on the basis of the positions and orientations of each magnetic object of said utensil that are obtained at the end of previous iterations of the variable-estimation step, and, in response to the detection of an immobile utensil, recording said utensil and the last position, orientation, and amplitude of the magnetic moment of each of the magnetic objects of the utensil to a list of immobile utensils, executing an establishment step, wherein the establishment step comprises establishing the measurements from the magnetometers when the magnetometers are exclusively in the presence of a reference magnetic field generated only by the magnetic objects of all the immobile utensils that are recorded in the list of immobile utensils, said reference magnetic field being calculated on the basis of the positions, orientations, and amplitudes of the magnetic moments of the magnetic objects of those utensils that have been recorded in the list of immobile utensils, and calculating the amplitude of a disturbance on the basis of the differences between the measurements performed in the measurement step and the measurements established in the establishment step, wherein locating the first mobile utensil comprises determining that an amplitude of the disturbance has crossed a first threshold and executing the variable-estimation step, and wherein locating the second mobile utensil comprises determining that the amplitude of the disturbance has failed to cross the first threshold, omitting the execution of the variable-estimation step, and returning to execute the measurement step without having executed the variable-estimation step.

2. The method according to claim 1, further comprising, in response to having determined that the amplitude of the disturbance has crossed the first threshold, identifying, from among the utensils that have been recorded in the list of immobile utensils, the utensil that has been moved, said list of immobile utensils having recorded therein, for each magnetic object of each immobile utensil: its position, its orientation and the amplitude of its magnetic moment, wherein identifying the utensil comprises calculating a barycenter of the disturbance, said barycenter being the barycenter of the positions of the various magnetometers of the network, wherein the position of each of the magnetometers is weighted by a difference between the measurements performed by said magnetometer in the measurement step and the measurements established for said magnetometer in the establishment step, and selecting, from the list of immobile utensils, the utensil whose magnetic objects are closest to said barycenter, the selected utensil being the identified utensil.

3. The method according to claim 2, further comprising determining that a distance that separates the utensil closest to the barycenter from the barycenter exceeds a predetermined threshold, and, in response to determining that said distance exceeds the predetermined threshold, adding, to the current system of equations, at least one new equation connecting new variables coding the position, the orientation and the amplitude of the magnetic moment of each magnetic object of a new utensil to each measurement from a triaxial magnetometer of the network in order to obtain a new system of equations, and using said new system of equations instead of the current system of equations for subsequent iterations of the measurement and variable-estimation steps, the new system of equations thus becoming, for the subsequent iterations of the measurement and variable-estimation steps, the current system of equations.

4. The method according to claim 1, further comprising, in response to determining that the amplitude of the disturbance has crossed the first threshold, identifying the utensil that has been moved among the utensils recorded in the list of immobile utensils, said list of immobile utensils having recorded, for each magnetic object of each immobile utensil: its position, its orientation, and the amplitude of its magnetic moment, wherein identifying the utensil comprises executing a field-estimation step, wherein the field estimation step comprises estimating the magnetic field measured by each of the magnetometers in the presence of a single immobile utensil and in the absence of any other utensil on the basis of the position, the orientation, and the amplitude of the magnetic moment of each magnetic object of said immobile utensil, which is recorded in the list of immobile utensils, and executing a correlation-calculation step, wherein the correlation-calculation step comprises calculating a correlation between the measurements estimated in the field-estimation step and differences between measurements performed by the magnetometers in the measurement step and measurement established for the magnetometers in the establishment step, and selecting, from the list of immobile utensils, the utensil that has the magnetic object(s) that exhibit(s) the highest correlation, calculated in the correlation-calculation step, the selected utensil being the identified utensil.

5. The method according to claim 4, further comprising, in response to determining that the highest correlation is below a predetermined threshold, adding, to the current system of equations, at least one new equation connecting new variables coding the position, the orientation, and the amplitude of the magnetic moment of each magnetic object of a new utensil to each measurement from a triaxial magnetometer of the network in order to obtain a new system of equations, then, after having obtained the new system of equations, using said new system of equations instead of a current system of equations for the subsequent iterations of the measurement and variable-estimation steps, the new system of equations thus becoming, for the subsequent iterations of the measurement and variable-estimation steps, the current system of equations.

6. The method according to claim 2, further comprising, in response to detecting an immobile utensil and adding said utensil to the list of immobile utensils, replacing, in the current system of equations, variables coding the position, the orientation, and the amplitude of the magnetic moment of each magnetic object of said utensil with constant numerical values that are equal to the current position, the current orientation, and the current amplitude of the magnetic moment of each magnetic object of said utensil in order to obtain a new system of equations in which the number of variables whose value needs to be estimated is smaller than the number of variables whose value needs to be estimated in the current system of equations, using the new system of equations instead of the current system of equations for the subsequent iterations of the measurement and variable-estimation steps, the new system of equations thus becoming, for subsequent iterations of the measurement and variable-estimation steps, the current system of equations, and, in response to identifying said utensil during a subsequent iteration of the step of identification of the utensil that has been moved, replacing, in the current system of equations, the constant numerical values coding the position and the orientation of each magnetic object of said utensil with variables in order to obtain a new system of equations in which the number of variables whose value needs to be estimated is larger than the number of variables whose value needs to be estimated in the current system of equations and using the new system of equations instead of the current system of equations for the subsequent iterations of the measurement and variable-estimation steps.

7. The method according to claim 1, further comprising eliminating, from the current system of equations, variables coding the position, the orientation, and the amplitude of the magnetic moment of each magnetic object of a utensil if an estimated distance between said utensil and the network of magnetometers exceeds a predetermined threshold thereby obtaining a new system of equations, and using said new system of equations instead of the current system of equations for subsequent iterations of the measurement step and the variable-estimation step, the new system of equations thus becoming, for subsequent iterations of the measurement step and the variable-estimation steps, the current system of equations.

8. The method according to claim 4, further comprising, in response to detecting an immobile utensil and adding said utensil to the list of immobile utensils, replacing, in the current system of equations, variables coding the position, the orientation, and the amplitude of the magnetic moment of each magnetic object of said utensil with constant numerical values that are equal to the current position, the current orientation, and the current amplitude of the magnetic moment of each magnetic object of said utensil in order to obtain a new system of equations in which the number of variables whose value needs to be estimated is smaller than the number of variables whose value needs to be estimated in the current system of equations, using the new system of equations instead of the current system of equations for the subsequent iterations of the measurement and variable-estimation steps, the new system of equations thus becoming, for subsequent iterations of the measurement and variable-estimation steps, the current system of equations, and, in response to identifying said utensil during a subsequent iteration of the step of identification of the utensil that has been moved, replacing, in the current system of equations, the constant numerical values coding the position and the orientation of each magnetic object of said utensil with variables in order to obtain a new system of equations in which the number of variables whose value needs to be estimated is larger than the number of variables whose value needs to be estimated in the current system of equations and using the new system of equations instead of the current system of equations for the subsequent iterations of the measurement and variable-estimation steps.

9. The method of claim 1, wherein said first and second magnetic utensils are the same magnetic utensil.

10. The method of claim 1, wherein said first and second magnetic utensils are different.

11. The apparatus of claim 1, wherein said first magnetic utensil is selected to be a piece of a chess set.

12. A non-transitory computer-readable medium containing program instructions for causing a computer to execute the method of claim 1.

13. An apparatus for locating mobile utensils, each utensil having at least one magnetic object and one or more utensils being able to be moved directly manually by a human being while the other utensils remain immobile, said apparatus comprising a network of magnetometers and a processing unit, said network having at least five triaxial magnetometers mechanically connected to one another without any degree of freedom in order to preserve a known distance between each of the magnetometers, wherein each magnetometer has measurement axes, wherein each utensil has at least one magnetic object, wherein the processing unit is programmed to locate first and second magnetic utensils by executing the method recited in claim 1.

14. The apparatus of claim 13, wherein at least two of the magnetometers have different sensitivities.

15. The apparatus of claim 13, wherein said magnetometers are arranged in rows and columns of an array.

16. The apparatus of claim 13, further comprising a rigid plate made of non-magnetic material, wherein said magnetometers are fixed to said rigid plate.

17. The apparatus of claim 13, further comprising a memory in communication with said processing unit, said memory comprising a database that records immobile utensils and respective positions thereof.

18. The apparatus of claim 13, wherein each magnetometer is separated from a closest neighboring magnetometer by a distance that is less than a shortest distance that exists between two magnetic objects that are simultaneously present on the face of a plate that separates said magnetometers from said magnetic utensils.

19. The apparatus of claim 13, wherein each magnetometer is separated from a closest neighboring magnetometer by a distance that is less than or equal to half of a shortest distance that exists between two magnetic objects that are simultaneously present on the face of a plate that separates said magnetometers from said magnetic utensils.

20. The apparatus of claim 13, wherein said processing unit is configured to receive, from said magnetometers, data indicative of a disturbance having a barycenter, said disturbance being associated with movement of a magnetic utensil, retrieving, from said database, data concerning a magnetic field generated by utensils identified in said database, and identifying said utensil based at least in part on said disturbance and on said data.

* * * * *